United States Patent Office 3,022,251
Patented Feb. 20, 1962

3,022,251
STABILIZED FOAM-PROVIDING COMPOSITION
Bernard J. Thiegs, Midland, Mich., assignor to The Dow Chemical Company, Midland, Mich., a corporation of Delaware
No Drawing. Filed Apr. 27, 1959, Ser. No. 808,871
4 Claims. (Cl. 252—307)

This invention has reference to a novel stabilizing agent or additament for foams that have been spumed by internal chemical generation of a gaseous propellant or blowing agent from an aqueous, foam-providing composition.

The present application is a continuation-in-part of the copending application for United States Letters Patent having Serial No. 660,671, now Patent No. 2,949,426, which was filed May 21, 1957, by Bernard J. Thiegs for "Stable Aqueous Foam Compositions."

There are many vital uses for foams of the type characterized as "chemical" foams that have been obtained from aqueous foam-providing compositions. Fire fighting and fugitive insulation are prominent among the possible applications of such materials. As is indicated by J. J. Bikerman in his work entitled "Foams: Theory and Industrial Applications," Reinhold Publishing Co., N.Y. (1953), such foams may be generated from aqueous solutions or dispersions of spumiferous materials as a result of an effervescing gas that functions as a propellant or blowing agent and which is internally produced through the chemical reaction of various constituents in certain kinds of foam-providing compositions. Such foams are typified by the well known sodium bicarbonate-aluminum sulfate variety of compositions that are utilized as fire fighting implements. It is necessary for the foam-providing composition to contain at least one constituent that is spumable in aqueous dispersion and adapted in such form to provide the continuous phase that constitutes the walls of the cells or bubbles in the foam products derived therefrom.

Very few of the materials that are spumiferous in aqueous dispersion are inherently adapted to provide efficacious and longeval foam structures. To overcome this, it is common to utilize stabilizing ingredients in foam-providing compositions in order to augment the lasting qualities and prolong the life span of foam structures that may be generated therefrom. A variety of foam stabilizers are known and have been employed. Some of these have been discussed, for example, in Bikerman's treatise, supra, and in a comprehensive series of articles that are to be found in Industrial and Engineering Chemistry, vol. 18, No. 11 (November, 1956), at pages 2012-2051. By way of specific illustration, saponin has been disclosed in U.S. Patent No. 1,507,943 as an effective stabilizer for "chemical" foams of the sodium bicarbonate-aluminum sulfate type.

Despite its general efficacy as a stabilizer for foams from aqueous foam-providing compositions, saponin is a relatively expensive material, even when it is obtained in its most economical form. The same applies to certain other conventionally employed foam stabilizers, including certain licorice root extracts that are commonly used for such purpose.

It would be advantageous, and it is the principal objective of the present invention, to provide novel, effective and exceptionally economical stabilizing agents for aqueous foam-providing compositions.

It would be equally advantageous, and it is also an object of the invention, to provide the utile aqueous foam-providing compositions that contain such a beneficial stabilizing additament and the long lasting foam structures generated therefrom.

The attainment of these ends and corollary objectives of the invention, as well as its many salient features and advantages will be manifest in the description and specification following.

The invention comprehends the utilization of the polycarboxylic acids that may be obtained upon or from the oxidation of coal and the like carbonaceous substances (hereinafter referred to as "coal acids") as the stabilizing agent for or the stabilizing ingredient in aqueous foam-providing compositions that contain at least one constituent, in conventional amounts, that is spumiferous in aqueous dispersion, which compositions, for maximum benefit, are not capable of neutralizing or forming salts of or with the free coal acids additament. It is usually of greater desirability for the aqueous, coal acid-containing, foam-providing compositions to have a pH in the acidic ranges below neutral, especially when their pH values are less than about 4.

The free coal acids may be employed with great advantage to stabilize the "chemical" type foams, including the conventional sodium bicarbonate-aluminum sulfate types and the like. In order to achieve maximum benefit when they are being so utilized, care should be taken to avoid neutralizing the free coal acids with any basic ingredients that may be present and used in and during generation of the foam-forming gas. This may be accomplished readily by mixing the coal acids with the non-basic constituent of the "chemical" foam-providing composition that is chemically inert or relatively so to the coal acids. In this way, the stabilizing agent is left in the free acid form to serve its intended function of prolonging the life and enhancing the physical characteristics of the foam structure that is generated from the composition after the gas supplying reaction has been accomplished with a constituent that might possibly react with the free coal acids to cause their neutralization by forming salts therewith.

Thus, in a sodium bicarbonate-aluminum sulfate system, the free coal acids additive may be incorporated in the alum solution wherein it remains unneutralized and available to stabilize the foam that is formed upon the gas-generating reaction between the aluminum sulfate (i.e., alum) and the sodium bicarbonate or like and equivalent alkali metal bicarbonate or carbonate substance.

The concentration of the free coal acids that is employed in the aqueous foam-providing composition may advantageously be a minor proportion, generally between about 0.05 and 5 percent by weight, based on the weight of the composition, in order to obtain stable and long-lasting derivative foams from the composition. Of course, the relative degree of stability may depend somewhat upon the particular foam-providing composition that is employed as well as the relative proportion of the free coal acids that is incorporated in the composition. Generally, the invention may be practiced with greatest efficacy when the aqueous foam-providing compositions and the foams that are generated therefrom contain an amount by weight of the free coal acids as a stabilizing additament that is between about 0.25 and 1 percent.

It is ordinary to employ more than 0.25 and less than about 25 percent by weight of the spumiferous constituent in the foam-providing composition and, quite often, amounts between about 0.5 and 10 percent by weight of such constituents are found to be suitable.

The free coal acids that are employed with such advantage as the stabilizing agent in and for the aqueous foam-providing compositions of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by carbonization of coal at temperatures beneath about 700° C. Coal acids that have been obtained by the nitric acid oxidation of suitable carbonaceous materials are also generally satisfactory. Such coals that are of the varieties known as anthracite, bituminous, sub-bituminous and lignite and other low grade coals are ordinarily suitable for the production of coal acids. Satisfactory cokes are those produced according to conventional techniques from coal at a temperature beneath about 700° C. The utilization of higher coking temperatures frequently causes the cokes that are obtained to be graphitic and rendered unsuitable for conversion to coal acids in satisfactory yields.

The free coal acid product is a hygroscopic, essentially water-soluble material that usually has a predominantly yellowish coloration. It is believed to be substantially comprised of various aromatic polycarboxylic acids. The average molecular weight of the coal acids that are ordinarily obtained is frequently in the neighborhood of 250–300, with a value of about 270–280 being fairly common. Their average equivalent weight is oftentimes about 80 and generally in the range from about 70 to about 90. They ordinarily appear to have an average of about two and one-half to five carboxylic groups per molecule with an apparent average of about three to four being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids that have been prepared and obtained in the described fashion have been found to consist of methyl-naphthalene, benzene, biphenyl, naphthalene, phenanthrene, alkyl benzene, benzophenone and toluene nuclei. As is apparent, the free coal acids are a relatively inexpensive and economically attractive material.

In order to demonstrate the efficacy of free coal acids as a stabilizer for "chemical" type foams of the sodium bicarbonate-aluminum sulfate type, three compositions were prepared which employed the foam-providing chemicals in the standard proportions of about 0.3 pound of the aluminum sulfate, $(Al_2SO_4)_3 \cdot 18 H_2O$, per 1⅜ pounds of sodium bicarbonate, $NaHCO_3$, per each two gallons of water. For each composition, the quantities actually employed were sufficient to make up about a 200 milliliter volume and consisted of separate solutions of (a) about 7.0 grams of the alum dissolved in about 50 milliliters of water and (b) about 16.6 grams of the bicarbonate of soda dissolved in about 150 milliliters of water. When these solutions are brought together, the well-known gas generating reaction occurs which effervesces or froths to form the desired foam from the combined foam-providing composition. However, unless a stabilizing agent is present in the resulting foam structure, the spumous product lasts for only a short time; usually not long enough to afford practical value.

This was shown by the results of the composition designated "X" in which the alum and bicarbonate solutions were directly mixed together without incorporating any additive in either. The mixture did not form foam. After a brief, initial effervescense which persisted for only several seconds, only the original total liquid volume of about 200 milliliters remained. In the second composition, designated "Y," about a gram of saponin was dissolved in the alum solution before mixing it with the bicarbonate. A tight, stable foam occupying a volume of about 1400 milliliters and persisting for about an hour was formed. The third composition, designated "Z," was prepared according to the present invention by adding about a gram of free coal acids to the alum solution before mixing it with the bicarbonate. The coal acids had an average molecular weight of about 284 (as determined by boiling point elevation techniques), an apparent equivalent weight of about 84.6 and, upon analysis was found to contain about 54.36 percent by weight of combined carbon; about 3.10 percent by weight of combined hydrogen; about 0.52 percent by weight of combined nitrogen; about 0.16 percent by weight of combined sulphur; and to have a carbon-to-hydrogen ratio of about 1.46:1, respectively; with an average functionality or number of carboxylic groups per molecule of about 3.36. A good quantity of longeval foam was obtained from the coal acids-containing composition. The volume of the foam was between 1600 and 1700 milliliters. While structurally, the foam from composition "Z" was not quite as tight as the saponin stabilized foam from composition "Y," it persisted for a considerable period of time (more than half-an-hour) in comparison.

Results that are analogous to those illustrated in the foregoing examples may be obtained when free coal acids are employed to stabilize other aqueous foam-providing compositions of spumiferous materials. Generally, to ensure this (as is apparent in the foregoing), it is best to employ the coal acids in compositions and foams resulting therefrom that have a pH which is acidic, particularly when their pH has a value that is less than about 4.

Certain changes and modifications in the practice of the present invention can obviously be made without departing substantially from its intended spirit and scope. As a consequence, the invention is not intended to be limited or otherwise restricted to or by the preferred docent embodiments thereof with which the foregoing description and specification are delineated. Rather, it is to be interpreted and construed in the light of what is set forth and defined in the hereto appended claims.

What is claimed is:
1. A stabilized foam-providing composition consisting essentially of water in which there is dissolved (1) between about 0.25 and 25 percent by weight of alum which is adapted to react chemically with a gas-generating alkali metal carbonate substance in order to be spumed into a foam structure and (2) between about 0.05 and 5 percent by weight of coal acids, both based on the weight of the composition, said coal acids being composed of water-soluble polycarboxylic aromatic products of the oxidation of coal which have an average molecular weight in the range between about 250 and 300, an average equivalent weight between about 70 and 90, and which contain an average of from about 2.5 to 5 carboxylic groups per aromatic nucleus in each molecule.

2. The stabilized foam-providing composition of claim 1, containing between about 0.25 and 1 percent by weight of the coal acids.

3. The stabilized foam-providing composition of claim 1 having a pH that is acidic.

4. The stabilized foam-providing composition of claim 1 having a pH that is less than about 4.

References Cited in the file of this patent

UNITED STATES PATENTS

| | | |
|---|---|---|
| 1,981,506 | Hansen | Nov. 20, 1934 |
| 2,258,587 | Goodner | Oct. 14, 1941 |
| 2,289,688 | Wright | July 14, 1942 |
| 2,355,935 | White | Aug. 15, 1944 |
| 2,405,538 | White | Aug. 6, 1946 |
| 2,477,255 | Keil et al. | July 26, 1949 |
| 2,555,410 | Howard | June 5, 1951 |
| 2,949,426 | Thiegs | Aug. 16, 1960 |

OTHER REFERENCES

Chem. Abstracts, vol. 19, pp. 1076–1077 (1925), article by Bartsch.